(12) United States Patent
Kobayashi et al.

(10) Patent No.: US 6,437,901 B1
(45) Date of Patent: Aug. 20, 2002

(54) ELECTROCHROMIC DEVICE

(75) Inventors: Masaaki Kobayashi; Izuru Sugiura; Yoshinori Nishikitani, all of Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/562,540

(22) Filed: May 2, 2000

Related U.S. Application Data

(63) Continuation of application No. PCT/JP98/04979, filed on Nov. 5, 1998.

(30) Foreign Application Priority Data

Nov. 5, 1997 (JP) .............................. 9-342316

(51) Int. Cl.[7] .............................. G02F 1/153
(52) U.S. Cl. .................. 359/267; 359/265; 359/268; 359/272; 359/273; 359/274; 252/586
(58) Field of Search .................. 359/265, 267, 359/268, 272, 273, 274

(56) References Cited

U.S. PATENT DOCUMENTS

| | | | | |
|---|---|---|---|---|
| 4,598,979 A | * | 7/1986 | Sugiuchi et al. ............ | 359/267 |
| 4,841,021 A | * | 6/1989 | Katritzky et al. ............ | 528/407 |
| 4,898,923 A | * | 2/1990 | Katritzky et al. ............ | 528/73 |
| 4,902,108 A | * | 2/1990 | Byker ........................ | 359/265 |
| 5,142,406 A | * | 8/1992 | Lampert et al. ............. | 359/269 |
| 5,232,574 A | * | 8/1993 | Saika et al. ................. | 204/418 |
| 5,471,554 A | * | 11/1995 | Rukavina et al. ........... | 385/131 |
| 5,818,636 A | * | 10/1998 | Leventis et al. ............ | 359/273 |
| 5,998,617 A | * | 12/1999 | Srinivasa et al. ........... | 544/347 |
| 6,023,364 A | * | 2/2000 | Kobayashi et al. ......... | 359/265 |
| 6,203,154 B1 | * | 3/2001 | Kobayashi et al. ......... | 359/265 |
| 6,248,263 B1 | * | 6/2001 | Tonar et a l. ................ | 252/583 |
| 6,285,486 B1 | * | 9/2001 | Kobayshi et al. ........... | 359/265 |

FOREIGN PATENT DOCUMENTS

| | | | |
|---|---|---|---|
| JP | 59-217787 A | * | 12/1984 |
| JP | Sho 63-18336 | | 1/1998 |

* cited by examiner

*Primary Examiner*—Evelyn A. Lester
(74) *Attorney, Agent, or Firm*—Akin, Gump, Strauss, Hauer & Feld, L.L.P.

(57) ABSTRACT

An electrochromic mirror comprising two conductive substrates, at least one of which is transparent, and both of an ion conductor layer and an electrochromic color-developing layer sandwiched between the substrates, wherein the color-developing layer contains a high-molecular compound having a biologen structure.

10 Claims, 1 Drawing Sheet

ELECTROCHROMIC DEVICE

CROSS-REFERENCE TO RELATED APPLICATIONS

This application is a continuation of International Application PCT/JP98/04979, filed Nov. 5, 1998.

FIELD OF THE INVENTION

This invention relates to electrochromic devices and more particularly electrochromic mirrors which are useful as light controllable elements such as light controllable windows (smart windows) for buildings, automobiles and passenger vehicles and various types of light controllable glasses for indoor decoration or partitions; display devices; antidazzle mirrors for automobiles; and decoration mirrors for indoor use.

DESCRIPTION OF THE PRIOR ART

A conventional electrochromic device such as a conventional type of antidazzle mirror as disclosed in Japanese Patent Laid-Open Publication No. 63-18336 is known which mirror comprises a chromogenic material in the form of a film obtained by sputtering or vacuum-depositing an inorganic oxide such as tungsten oxide ($WO_3$) over a transparent electrically conductive film.

PROBLEMS TO BE SOLVED

Such an electrochromic antidazzle mirror is manufacture by a film forming operation carried out under vacuum conditions, resulting in increased production cost. A demand has therefore been placed on an electrochromic mirror which can be manufactured with inexpensive materials and by a simple and easy method.

A method has also been proposed in which to use a viologen compound as a component constituting an electrochromic device. However, further improvements on this method are demanded because the purification of viologen requires time and effort and the life or duration of coloration or decoloration functions of the device may be shortened, resulting from impurities such as an acid even in small amounts mixed into the system of the device.

DETAILED DESCRIPTION OF THE INVENTION

It is an object of the present invention to solve the aforementioned problems by using specific electrically conductive high molecular compounds as a color developing film or layer.

According to the present invention, there is provided an electrochromic device comprising two conductive substrates, at least one of which is transparent, an ion conductive layer disposed therebetween and an electrochromic color developing layer disposed between the ion conductive layer and at least either one of the two conductive substrates and containing (A) a compound having a viologen structure represented by the formula

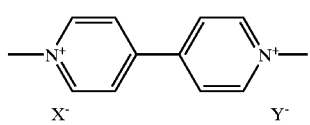

(1)

wherein $X^-$ and $Y^-$ may be the same or different and each are a counter anion selected from the group consisting of a halogen anion, $ClO_4^-$, $BF_4^-$, $PF_6^-$, $CH_3COO^-$ and $CH_3(C_6H_4)SO_3^-$ and (B) 4,4'-dipyridyl and/or a mono-substituted 4,4'-dipyridinium salt represented by the formula

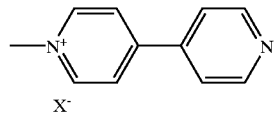

(2)

wherein $X^-$ is a counter anion selected from the group consisting of a halogen anion, $ClO_4^-$, $BF_4^-$, $PF_6^-$, $CH_3COO^-$ and $CH_3(C_6H_4)SO_3^-$.

According, to another aspect of the present invention, there is provided an electrochromic device all of which components are solid.

According to further another embodiment of the present invention, there is provided an electrochromic mirror which comprises a reflective conductive substrate, a transparent substrate, an ion conductive layer disposed therebetween and an electrochromic color developing layer disposed between the ion conductive and the reflective conductive substrate or transparent substrate.

The two conductive substrates, at least one of which is transparent, are used in the present invention. These substrates may be any type of substrates as long as they function as an electrode. More specifically, each of the conductive substrate may be those entirely formed from an electrically conductive material or those comprised of a non-electrically conductive substrate and an electrode layer disposed thereon. An electrochromic mirror according to the present invention includes a pair of such electrically conductive substrates, at least one of which is transparent and the other of which is reflective of light or non-reflective opaque. These transparent, reflective and opaque substrates may have a flat or curved surface and may be deformable under stress.

The transparent conductive substrate may generally exemplified by a laminate comprising a transparent substrate and a transparent electrode layer formed thereon. The reflective electrically conductive substrate may be exemplified by (1) a laminate comprising a transparent or opaque substrate and a reflective electrode layer formed thereon, (2) a laminate comprising a substrate having a transparent electrode layer on one of its surfaces and a reflective electrode layer on the other surface, (3) a laminate comprising a transparent substrate having a reflective layer formed thereon and further a transparent electrode layer formed thereon and (4) a plate-like substrate which itself functions as a reflective layer and an electrode. The non-reflective opaque conductive substrate is exemplified by a substrate selected from various metal plates or a laminate comprising a non-conductive opaque substrate such as various opaque plastics, ceramics, glasses and woods and an electrode formed on its surface.

No particular limitations is imposed on the transparent substrate. It may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate and polystyrene.

The term "transparency" used herein designates an optical transmission which is in the range from 10 to 100 percent.

The substrates used for the invention have a smooth surface at normal temperature.

There is no particular restriction to the transparent electrode layer as long as it meets the requirements for achieving the purpose of the present invention. Specific examples of the electrode layer include electrically conductive films such as thin films of various types of metals such as gold, silver, chrome, copper and tungsten or of metal oxides such as ITO ($In_2O_3$—$SnO_2$), tin oxide, silver oxide, zinc oxide and vanadium oxide.

The electrode has a film thickness in the range of usually 100 to 5,000 and preferably 500 to 3,000 angstrom. The surface resistance of the electrode is usually in the range of 0.5–500 and preferably 1–50 $\Omega$/sq.

No particular limitation is imposed on a method of forming the electrode layer. Any suitable conventional methods may be employed, depending upon the kind of metal and metal oxide constituting the electrode. In general, the formation of the electrode layer is carried out by vacuum evaporation, ion plating, sputtering and a sol-gel method. The thickness of the electrode layer is selected within the range such that the transparency thereof is not affected. The electrode layer may be partially provided with an opaque electrode-activator for the purpose of imparting oxidation-reduction capability, electric conductivity and electric double layer capacitance, the electrode-activator being provided in an amount such that the transparency of the entire electrode layer is not harmed. Electrode activators eligible for the purpose of the invention arc metals such as copper, silver, gold, platinum, iron, tungsten, titanium and lithium, organic materials having oxidation-reduction capability such as polyaniline, polythiophen, polypyrrole and phthalocyanine, carbon materials such as active carbon and graphite and metal oxides such as $V_2O_5$, $WO_3$, $MnO_2$, $NiO$ and $Ir_2O_3$ and mixtures thereof. A variety of resins may be used for integrating the electrode activator in the electrode. The opaque electrode activator may applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of a mesh.

No particular limitation is imposed on the reflective electrode layer as long as it is electrochemically stable and has a specular surface. Eligible reflective electrode layers include metal films such as of gold, platinum, tungsten, tantalum, rhenium, osmium, iridium, silver, nickel and palladium and alloy films such as of platinum-palladium, platinum-rhodium and stainless steel. The reflective electrode layer is necessarily disposed onto a substrate or a transparent substrate with the reflectiveness and specularity of the layer maintained. The reflective electrode layer is formed onto a substrate by any suitable conventional method such as vacuum deposition, ion-plating and sputtering.

No particular limitation is imposed on a substrate on which the reflective electrode layer is disposed. The substrate may be transparent or opaque. Specific examples of the substrate include those as exemplified with respect to the transparent substrate described above, a variety of plastics, resins, glasses, woods and stones.

No particular limitation is imposed on a material for the above-mentioned reflective plate or layer as long as it can provide a specular surface. For example, silver, chrome, aluminum and stainless steel are eligible.

The plate-like substrate having a reflective layer and functioning as an electrode may be exemplified by the substrates exemplified with respect to the reflective electrode among which are self-supportive.

An ion conductive material used for the inventive electrochromic mirror is disposed so as to be sandwiched between a reflective electrically conductive substrate or non-reflective opaque substrate and a transparent electrically conductive substrate (these substrates are hereinafter referred to as counter-conductive substrates). No particular limitation is imposed on a method of disposing the ion conductive material between the counter-conductive substrates. A method may be employed in which the ion conductive material is injected into the space provided between the substrates which are placed, facing each other and then sealed at the edges of the opposed surfaces, by vacuum injection, atmospheric injection or a meniscus method. Alternatively, a method may be employed in which the layer of the ion conductive material is formed on the electrode layer of one of the electrically conductive substrates and then put together with the other electrically conductive substrate. Further alternatively, a method may be employed in which a film-like ion conductive material is inserted between a pair of glasses to form a laminated glass.

The term "ion conductive material" designates materials which can color, decolor and discolor an electrochromic material hereinafter described. The ion conductive material has preferably an ion conductivity of $1\times10^{-7}$S/cm or more at room temperature. No particular limitation is imposed on the ion conductive material, which may thus be liquid, gel or solid. Solid ion conductive materials are particularly preferred for the purpose of the invention so as to obtain an electrochromic mirror which is overall solid and excelled in various performances for practical usage.

Eligible liquid ion conductive materials are those dissolving a supporting electrolyte such as salts, acids and alkalis in a solvent.

Although any suitable solvents may be used as long as they can dissolve a supporting electrolyte, preferred are those having polarity. Specific example of such solvents are water and an organic polar solvent such as methanol, ethanol, propylene carbonate, ethylene carbonate, dimethylsulfoxide, dimethoxyethane, acetonitrile, r-butyrolactone, r-valerolactone, sulforan, dimethylformamide, dimethoxyethane, tetrahydrofuran, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, a-butyrolactone, sulforan, dioxolane, dimethylformamide, tetrahydrofuran, adiponitrile, methoxyacetonitrile, dimethylacetoamide, methylpyrrolidinone, dimethylsulfoxide, trimethylphosphate and polyethylene glycol. These may be used singlely or in combination.

Although not restricted, salts used as a supporting electrolyte may be alkali metal salts, inorganic ion salts such as alkaline earth metal salts, quaternary ammonium salts and cyclic quaternary ammonium salts. Specific examples of such salts include alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$ and mixtures thereof.

Acids used as a supporting electrolyte may be exemplified by inorganic acids and organic acids, specific examples of which include sulfuric acid, hydrochloric acid, phosphoric acid, sulfonic acid carboxylic acid.

Alkalis used as a supporting electrolyte include sodium hydroxide, potassium hydroxide and lithium hydroxide.

The gelatinized-liquid ion conductive material may be those which are gelatinized or made to be viscous by adding a polymer or a gelatinizer to the above-mentioned liquid ion conductive material.

No particular limitation is imposed on the polymers, which thus may be polyacrylonitrile, carboxymethylcellulose, polyvinyl chloride, polyethylene oxide, polyurethane, polyacrylate, polyamide, polyacrylamide, cellulose, polyester, polypropyleneoxide and nafion.

Preferred examples of gelatinizers are oxyethylenemethacrylate, oxyethyleneacrylate, urethaneacrylate, acrylamide and agar-agar.

No particular limitation is imposed on the solid ion conductive material as long as it is solid at room temperature and ion conductive. Preferred examples of such solid ion conductive materials are polyethylencoxide, the polymer of oxyethylenemethacrylate, nafion, polystylene sulfonate, $Li_3N$, $Na-\beta-Al_2O_3$ and $Sn(HPO_4)_2H_2O$. Particularly preferred are polymer solid electrolytes obtained by polymerizing a polyethylencoxide-based compound, an oxyalkyleneacrylate-based compound or a urethaneacrylate-based compound.

A first examples of such polymer solid electrolytes are those obtained by solidifying a composition (hereinafter referred to as Composition A) containing the above-described organic polar solvent and supporting electrolyte and a urethaneacrylate of the formula

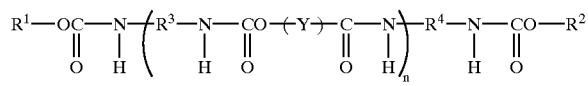

(3)

wherein $R^1$ and $R^2$ may be the same or different and are each a group of formula (4), (5) or (6) below, $R^3$ and $R^4$ may be the same or different and are each a $C_1$–$C_{20}$, preferably $C_2$–$C_{12}$ divalent hydrocarbon residue, Y is selected from a polyether unit, a polyester unit, a polycarbonate unit and the mixed unit thereof and n is an integer of 1–100, preferably 1–50 and more preferably 1–20.

Formulae (4), (5) and (6) are represented by

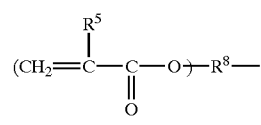

(4)

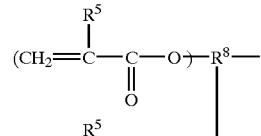

(5)

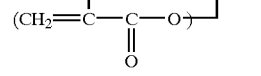

-continued

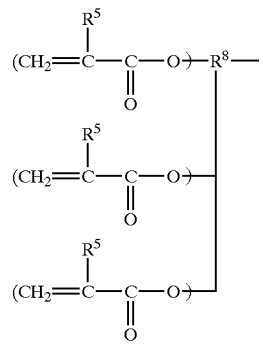

(6)

wherein $R^5$, $R^6$ and $R^7$ may be the same or different and are each a hydrogen atom or a $C_1$–$C_3$ alkyl group and $R^8$ is a $C_1$–$C_{20}$, preferably $C_2$–$C_8$ organic residue of divalent through quatervalent.

Specific examples of such organic residues are a hydrocarbon residue such as alkyltolyl, alkyltetratolyl and alkylene of the formula

(7)

wherein $R^9$ is a $C_1$–$C_3$ alkyl group or hydrogen, p is an integer of 0–6 and if p is greater than 2 the groups of $R^9$ may be the same or different.

The hydrocarbon residue may be a group part of which hydrogen atoms are substituted by an oxygen-containing hydrocarbon group such as a $C_1$–$C_6$, preferably $C_1$–$C_3$ alkoxy group and a $C_6$–$C_{12}$ aryloxy group.

Specific examples of group $R^8$ in formulae (3) thorough (5) are those represented by the following formulae:

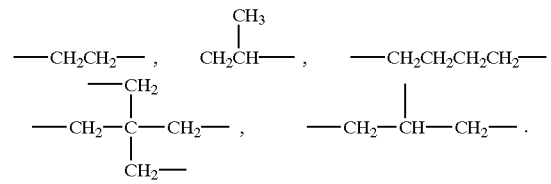

Each of the divalent hydrocarbon residues represented by $R^3$ and $R^4$ in formula (3) is exemplified by a divalent chain-like hydrocarbon group, an aromatic hydrocarbon group and an alicyclic-containing hydrocarbon group. Specific examples of the chain-like divalent hydrocarbon group are those represented by formula (7) above.

Specific examples of the aromatic hydrocarbon group and alicyclic-containing hydrocarbon group are those represented by the following formulae

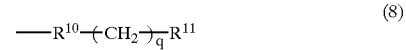

(8)

(9)

-continued

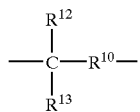
(10)

wherein $R^{10}$ and $R^{11}$ may be the same or different and each are a phenylene group, a phenylene group having an alkyl substituent, a cycloalkylene group and a cycloalkylene group having an alkyl substituent, $R^{12}$, $R^{13}$, $R^{14}$ and $R^{15}$ may be the same or different and each are a hydrogen atom or a $C_1$–$C_3$ alkyl group and q is an integer from 1 to 5.

Specific examples of the groups $R^3$ and $R^4$ in formula (II) are those represented by the following formulae:

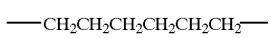
(11)

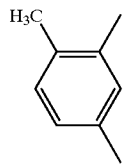
(12)

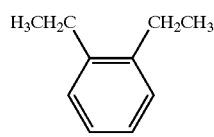
(13)

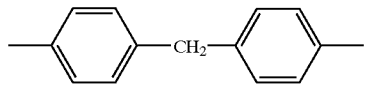
(14)

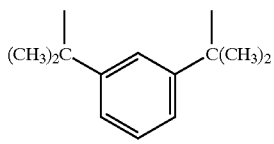
(15)

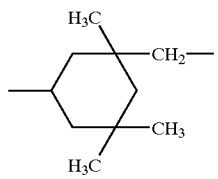
(16)

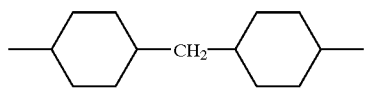
(17)

In formula (II), Y indicates a polyether unit, a polyester unit, a polycarbonate unit and a mixed unit thereof. Each of these units is represented by the following formulae:

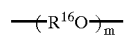
(a)

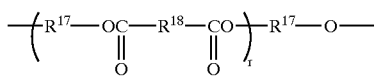
(b)

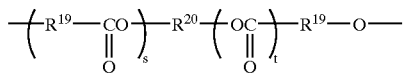
(c)

-continued

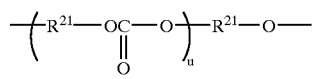
(d)

In formulae (a) through (d), $R^{16}$ through $R^{21}$ may be the same or different and are each a $C_1$–$C_{20}$, preferably $C_2$–$C_{12}$ divalent hydrocarbon residue. $R^{21}$ is particularly preferably a $C_2$–$C_6$ divalent hydrocarbon residue. $R^{16}$ through $R^{21}$ are preferably straight or branched alkylene groups among which methylene, ethylene, trimethylene, tetramethylene, pentamethylene, hexamethylene and propylene groups are preferred for $R^{18}$, and ethylene and propylene groups are preferred for $R^{16}$, $R^{17}$ and $R^{19}$ through $R^{21}$. The letter "m" in formula (a) is an integer of 2–300, preferably 10–200, the letter "r" is an integer of 1–300, preferably 2–200, the letter "s" is an integer of 1–200, preferably 2–100, the letter "t" is an integer of 1–200, preferably 2–100 and the letter "u" is an integer of 1–300, preferably 10–200.

Each unit represented by formulae (a) through (d) may be a copolymer of the same or different units. Namely, if there exist a plurality of groups of each $R^{16}$ through $R^{21}$, groups of each $R^{16}$, $R^{17}$, $R^{18}$, $R^{19}$, $R^{20}$ and $R^{21}$ may be the same or different. Preferred examples of such copolymers include copolymers of ethylene oxide and copolymers of propylene oxide.

An urethaneacrylate of formula (II) has a molecular weight in the range of 2,500–30,000, preferably 3,000–20,000.

The urethaneacrylate has preferably 2–6, more preferably 2–4 polymerization functional groups per molecule.

The urethaneacrylate may be prepared by any suitable conventional method.

An organic polar solvent (organic nonaqueous solvent) is added in an amount of 100–200, preferably 200–900 weight parts per 100 parts of the urethaneacrylate. Too less amount of the addition of the organic polar solvent would result in insufficient ion conductivity, while too much amount of the addition would cause reduced mechanical strength.

No particular limitation is imposed on a supporting electrolyte as long as it is not obstructive in achievement of the purpose of the invention. Preferred are those already exemplified above. The supporting electrolyte should be added in an amount of 0.1–30, preferably 1–20 weight percent of the organic polar solvent.

Composition (A) is obtained by solidifying the above-described essential components, namely, the above-described urethaneacrylate, organic nonaqueous solvent and supporting electrolyte. If necessary, any suitable optional components may be added to Composition (A) as long as they are not obstructive to the achievement of the purpose of the invention. Such components may be crosslinkers and photo- or thermal polymerization initiators.

The solid polymeric electrolyte of the first example may be inserted between a pair of electrically conductive substrates disposed, facing each other by injecting Composition (A) into a selected space between the substrates in a conventional manner and curing the same. The term "curing" used herein designates a state where polymerizing or crosslinking component is brought to be cured with the progress of polymerization (polycondensation) or crosslinking and thus the composition does not flow at room temperature. The composition thus cured has the basic structure in the form of network.

A second example of the polymeric solid electrolyte is obtained by solidifying a composition (hereinafter referred to as Composition (B)) comprising an organic polar solvent, a supporting electrolyte, a monofunctional acryloyle-modified polyalkylene oxide of formula (18) below and a polyfunctional acryloyle-modified polyalkylene oxide of formula (19) or (20) below.

Formula (18) is represented by

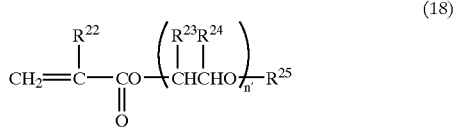

wherein $R^{22}$, $R^{23}$, $R^{24}$ and $R^{25}$ may be the same or different and are each hydrogen and an alkyl group having 1–5 carbon atoms and n is an integer of greater than 1.

Specific examples of the alkyl group include methyl, ethyl, i-propyl, n-propyl, n-butyl, t-butyl and n-pentyl. Preferred for $R^{22}$, $R^{23}$ and $R^{24}$ are hydrogen and a methyl group. Preferred for $R^{25}$ are hydrogen, methyl and ethyl groups.

The letter "n'" in formula (18) is an integer of greater than 1, usually from 1 to 100, preferably from 2 to 50 and more preferably from 2 to 30.

Specific examples of the compound represented by formula (18) are those having 1–100, preferably 2–50 and more preferably 1–20 oxyalkylene units, such as methoxypolyethylene glycol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If n is greater than 2, the compound may be those having different oxyalkylene units, that is, copolymerized oxyalkylene units which for instance have 1–50, preferably 1–20 oxyethylene units and 1–50, preferably 1–20 oxypropylene units. Specific examples of such compounds are (ethylene-propylene) glycol methacrylate, ethoxypoly (ethylene-propylene) glycol methacrylate, methoxypoly (ethylene-propylene) glycol methacrylate, methoxypoly (ethylene-propylene) glycol acrylate, ethoxypoly methoxypoly (ethylene-propylene) glycol acrylate and mixtures thereof.

The polyfunctional acryloyl-modified polyalkylene oxide may be a bifunctional acryloyl-modified polyalkylene oxide represented by the formula

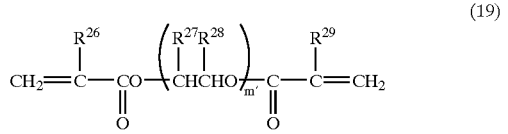

wherein $R^{26}$, $R^{27}$, $R^{28}$ and $R^{29}$ are each hydrogen and a $C_1$–$C_5$ alkyl group and m' is an integer of greater than 1; or a polyfunctional acryloyl-modified polyalkylene oxide having more than three functional groups represented by the formula

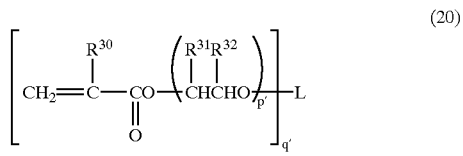

wherein $R^{30}$, $R^{31}$ and $R^{32}$ are each hydrogen and a $C_1$–$C_5$ alkyl group, p' is an integer of greater than 1, q' is an integer from 2 to 4 and L is a connecting group of valence indicated by q'.

In formula (19), $R^{26}$, $R^{27}$, $R^{28}$ and $R^{29}$ are each hydrogen or a $C_1$–$C_5$ alkyl group, such as methyl, ethyl, i-propyl, n-propyl, n-butyl, t-butyl, t-butyl and n-pentyl groups among which preferred are hydrogen and methyl. The letter "m'" in formula (19) is an integer of greater than 1, usually from 1 to 100, preferably from 2 to 50, and more preferably from 2 to 30. Preferred examples of compounds of formula (19) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If m is greater than 2, the compound of formula (19) may be those having, different oxyalkylene units, that is, polymerized oxyalkylene unit having, 1–50, preferably 1–20 oxyethylene units and 1–50, preferably 1–20 oxypropylene units, such as poly(ethylene-propylene)glycol dimethacrylate, poly(ethylene-propylene)glycol diacrylate and mixtures thereof.

In formula (20), $R^{30}$, $R^{31}$ and $R^{32}$ are each hydrogen or a $C_1$–$C_5$ alkyl group, such as methyl, ethyl, i-propyl, n-propyl, n-butyl, t-butyl and n-pentyl. Particularly preferred for $R^{30}$, $R^{31}$ and $R^{32}$ are hydrogen and a methyl group.

The letter "p" is an integer of greater than 1, usually from 1 to 100, preferably from 2 to 50 and more preferably from 2 to 30.

The letter "q" indicates the number of connecting group "L" and is an integer from 2 to 4.

Connecting group "L" is a divalent, trivalent or quatravalent hydrocarbon group having 1–30, preferably 1–20 carbon atoms.

Such divalent hydrocarbon groups may be alkylene, arylene, arylalkylene, alkylarylene and hydrocarbon groups having those groups as the base skeleton. Specific examples of such hydrocarbon groups are those represented by the following formulae

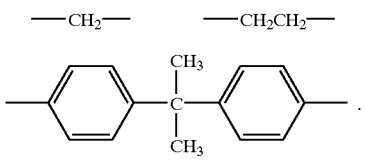

Such trivalent hydrocarbon groups may he alkyltryl, aryltryl, arylalkyltryl, alkylaryltryl and hydrocarbon groups having those groups as a base skeleton. Specific examples of such hydrocarbon groups are those represented by the following formulae

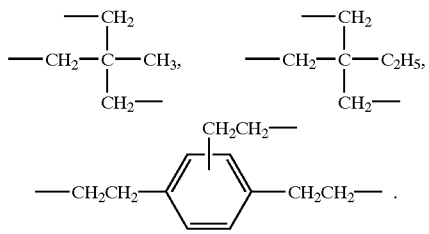

Such quatravalent hydrocarbon groups may be alkyltetraryl, aryltetraryl, arylalkyltetraryl, alkylaryltetraryl and hydrocarbon groups having those groups as the base skelton. Specific examples of such hydrocarbon groups are those represented by the following formulae:

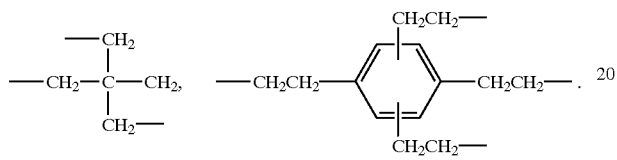

Specific examples of the compounds of formula (20) are those having 1–100, preferably 1–50, more preferably 1–20 of an oxyalkylene units such as trimethylolpropanetri (polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra(polyethylene glycol methaacrylate) tetramethylolmethanetetra(polypropylene glycol acrylate), tetramethylolmethanetetra(polypropylene glycol methaacrylate), 2,2-bis[4-(acryloxypolyethoxy) phenyl]propane, 2,2-bis[4-(methaacryloxypolyethoxy) phenyl]propane, 2,2-bis[4-(acryloxypolyisopropoxy) phenyl]propane, 2,2-bis[4-(methaacryloxypolyisopropoxy) phenyl]propane and mixtures thereof.

If p is more than 2, the compounds of formula (20) may be those having different oxyalkylene units, that is, polymerized oxyalkylene units having 1–50, preferably 1–20 of oxyethylene units and 1–50, preferably 1–20 oxypropylene units. Specific examples of such compounds include trimethylolpropanetri(poly(ethylene·propylene)glycol acrylate), trimethylolpropanetri(poly(ethylene·propylene) glycol methaacrylate), tetramethylolmethanetetra(poly (ethylene·propylene)glycol acrylate), tetramethylolmethanetetra(poly(ethylene·propylene)glycol acrylate) and mixtures thereof.

Needless to mention, there may be used a combination of a difunctional acryloyl-modified polyalkyleneoxide of formula (19) and a polyfunctional acryloyl-modified polyalkyleneoxide of formula (20). When these compounds are used in combination, the weight ratio of a compound of formula (19) to that of formula (20) is in the range from 0.01/99.9 to 99.9/0.01, preferably from 1/99 to 99/1 and more preferably from 20/80 to 80/20. The weight ratio of a compound of formula (18) to a polyfunctional acryloyl-modified polyalkyleneoxide is in the range of usually from 1/0.001 to 1/1, preferably from 1/0.05 to 1/0.5.

The above-described organic polar solvent should be added in an amount of 50–800, preferably 100–500 weight percent based on the total weight of the compound of formula (18) and the polyfunctional acryloyl-modified polyalkyleneoxide.

The above-described supporting electrolyte should be added in an amount of 1–30, preferably 3–20 weight percent based on the total weight of the compound of formula (18), the polyfunctional acryloyl-modified polyalkyleneoxide and the organic polar solvent.

If necessary, another optional components other than the above-described components may be added to Composition (B) as long as they do not give adverse effect on the inventive electrochromic mirror. Although not restricted, such components may be photopolymerization initiators or thermal polymerization initiators. These initiators should be added in an amount of 0.005–5, preferably 0.01–3 weight percent based on the total weight of the compound of formula (18) and the polyfunctional acryloyl-modified polyalkylene oxide.

The polymeric solid electrolyte described above as a second example may be inserted between a pair of electrically conductive substrates facing each other by injecting Composition (B) into a selected site therebetween by any suitable method. The "curing" used herein designates a state where a polymerizable or crosslinkable component such as monofunctional or polyfunctional acryloyl-modified polyalkyleneoxide is brought to be cured with the progress of polymerization or crosslinking and hence the composition entirely stays unfluidized. In this case, the monofunctional or polyfunctional acryloyl-modified polyalkyleneoxide has the basic structure in the form of networks.

Needless to mention, ion conductive materials other than those as described above are also eligible.

Next, an electrochromic color developing layer constituting the inventive electrochromic mirror is described. The electrochromic color developing layer used in the present invention is characterized in that it contains (A) a compound having a viologen structure represented by the formula (hereinafter referred to as Compound A)

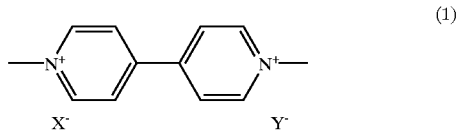

(1)

and (B) 4,4'-dipyridyl (hereinafter referred to as Compound B1) or a 1-substituted 4,4'-dipyridinium salt (hereinafter referred to as Compound B2) represented by the formula

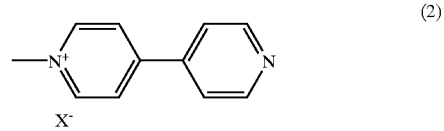

(2)

Compounds B1 and B2 are hereunder generically referred to as Compound B.

First, Compound (A) is described.

Compound (A) has a viologen structure represented by formula (1) above.

In formula (1), $X^-$ and $Y^-$ are each a counter anion and may be the same or different and an anion selected from the group consisting of a halogen anion, $ClO_4^-$, $BF_4^-$, $PF_6^-$, $CH_3COO^-$ and $CH_3(C_6H_4)S)_3^-$. The halogen anion may be $F^-$, $Cl^-$, $Br^-$ and $I^{31}$.

No limitation is imposed on the compound having a viologen structure as long as it possesses electrochromic properties. Such a compound is exemplified by high molecular weight compounds and low molecular weight compounds. Such high molecular weight compounds may be those having a viologen structural unit or a unit containing a viologen structure as a repeating unit or those having at their terminal ends a viologen structural unit as well as those having molecular chains part of which is substituted with a group having a viologen structure. Such low molecular weight compounds may be those having a viologen structure. The high molecular weight compounds having repeating units may be those of which side or main chain is formed by viologen structural units. There is no restriction to the repeating units forming the main chains of high molecular weight compounds if the side chains are formed by viologen structural units. Such repeating units forming the main chain may be hydrocarbon units, oxygen-containing units, nitrogen-containing units, polysiloxane units and copolymerized units thereof.

The compound having a viologen structure may be a polymer or copolymer represented by the formula

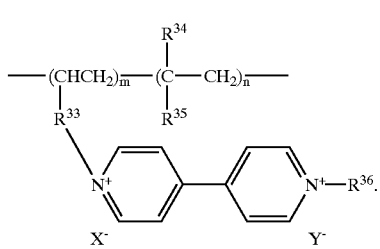

(21)

The letter "m" indicates an integer of more than 1, preferably from 1 to 1,000, and the letter "n" indicates an integer of more than 0, preferably from 0 to 1,000. $R^{33}$ is a $C_1$–$C_{20}$, preferably $C_1$–$C_{12}$ divalent hydrocarbon residue or merely indicates the bond of the viologen group directly to a polymer chain not through the hydrocarbon residue, namely covalently bond. Specific examples of hydrocarbon groups include aliphatic hydrocarbon groups such as methylene, ethylene, propylene, tetramethylene, pentamethylene and hexamethylene and aromatic hydrocarbon groups such as phenylene, biphenylene and benzylidene. Specific examples of oxygen-containing hydrocarbon groups include aliphatic alkoxylene groups such as —$OCH_2$—, —$OCH_2CH_2$— and —$OCH_2CH_2CH_2$—, aliphatic dialkoxylene groups such as —$OCH_2CH_2O$— and —$OCH_2CH_2CH_2O$—, aromatic aryloxy groups such as —$O(C_6H_4)$— and —$OCH_2(C_6H_4)$— and aromatic diaryloxy groups such as —$O(C_6H_4)O$— and —$OCH_2(C_6H_4)O$—.

$X^-$ and $Y^-$ each indicate a counter anion which is a monovalent anion, with respect to viologen and may be the same or different. $X^-$ and $Y^-$ may be a halogen anion such as $F^-$, $Cl^-$, $Br^-$ and $I^-$, $ClO_4^-$, $BF_4^-$, $PF_6^-$, $CH_3COO^-$ and $CH_3(C_6H_4)SO_3^-$.

$R^{34}$, $R^{35}$ and $R^{36}$ are each a $C_1$–$C_{20}$, preferably $C_1$–$C_{12}$ hydrocarbon group and a hetero atom-containing substituent and a halogen atom. Preferred hydrocarbon groups for $R^{34}$, $R^{35}$ and $R^{36}$ are alkyl groups such as methyl, ethyl, propyl and hexyl and an aryl group such as phenyl, tolyl, benzyl and naphtyl. Preferred hetero atom-containing substituents are a $C_1$–$C_{20}$, preferably $C_1$–$C_{12}$ oxygen-containing hydrocarbon group, amide, amino and cyano groups. Such oxygen-containing hydrocarbon groups include an alkoxyl group such as methoxy and ethoxy an aryloxy group such as phenoxy and triloxy, a carboxyl group and a residual carboxylic acid ester.

In the case where the compound of formula (21) is a copolymer, the copolymerization pattern of the repeating units may be that of block-, random- or alternate copolymerization.

The compound having a viologen structure may also be a polymer or copolymer represented by the formula

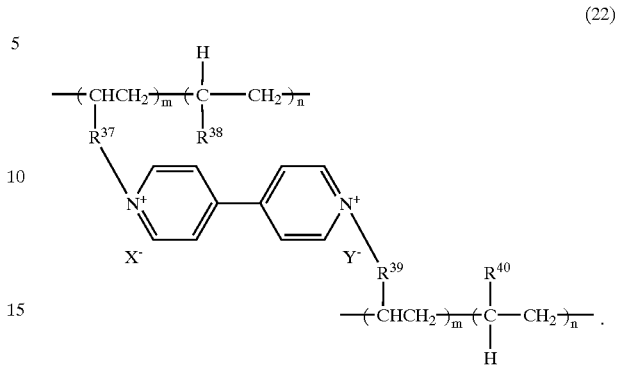

(22)

In formula (22), m, n and $X^-$ and $Y^-$ are the same as defined in formula (21) and n is preferably 0. $R^{37}$ and $R^{39}$ may be the same or different and are each the same as those as defined with respect to $R^{33}$ in formula (21) and $R^{38}$ and $R^{40}$ may the same or different and each are the same as those as defined with respect to $R^{34}$ in formula (21).

In the case where a compound of formula (22) is a copolymer, the copolymerization pattern of the repeating units may be that of block, random or alternate polymerization.

Moreover, the compound having a viologen structure may also be a polymer or copolymer represented by the formula

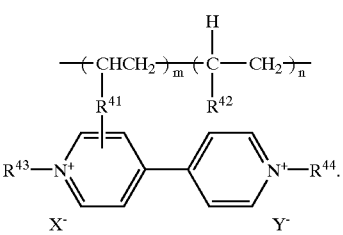

(23)

In formula (23), m, n and $X^-$ and $Y^-$ are the same as those as defined in formula (21) and n is preferably 0. $R^{41}$ is the same as those as defined with respect to $R^{33}$ in formula (21) and $R^{42}$, $R^{43}$ and $R^{44}$ may be the same or different and each are the same as those as defined with respect to $R^{34}$ in formula (21).

In the case where the compound of formula (23) is a copolymer, the copolymerization pattern of the repeating units may be that of block, random or alternate of polymerization.

Furthermore, the compound having a viologen structure may be a copolymer represented by the formula

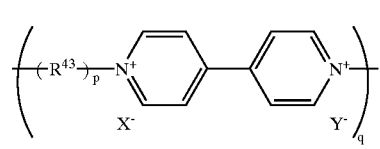

(24)

In formula (24), p is an integer of more than 0, preferably from 0 to 20, q is an integer of 0–1,000 and $R^{45}$ is the same as those as defined with respect to $R^{33}$ in formula (21).

Further alternatively, the compound having a viologen structure may also be a polymer or copolymer of the formula

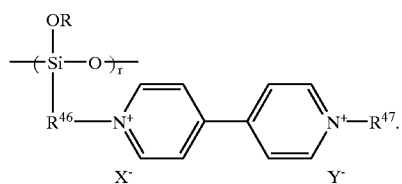

(25)

In formula (25), R is a $C_1$–$C_{10}$ alkyl group, r is an integer of more than 1, preferably from 1 to 1,000, $R^{46}$ is the same as those as defined with respect to $R^{33}$ in formula (21) and $R^{47}$ is the same as those as defined with respect to $R^{33}$ in formula (21).

Typical examples of the compound having a viologen structure used for the present invention have been exemplified by compounds of formulae (21) through (25). Specific examples of compounds which are included within the range of these formulae and which are not included within the range of these formulae but eligible for the invention are given below. Pr in the following formulae indicates a propyl group.

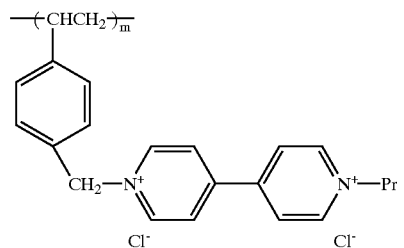

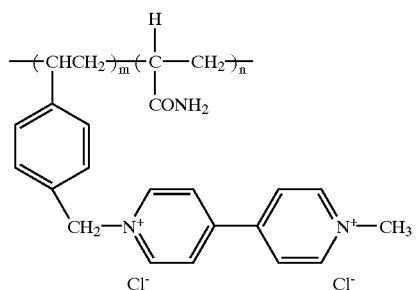

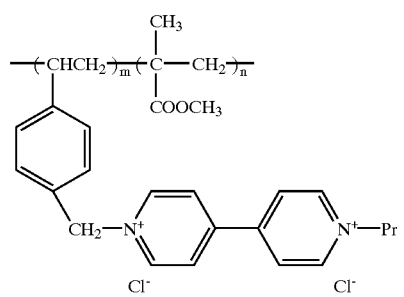

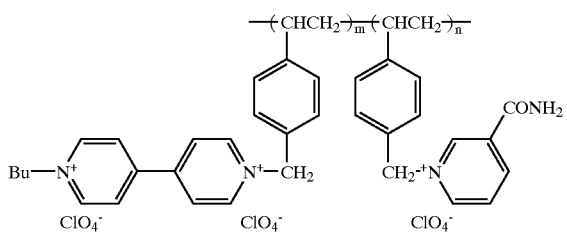

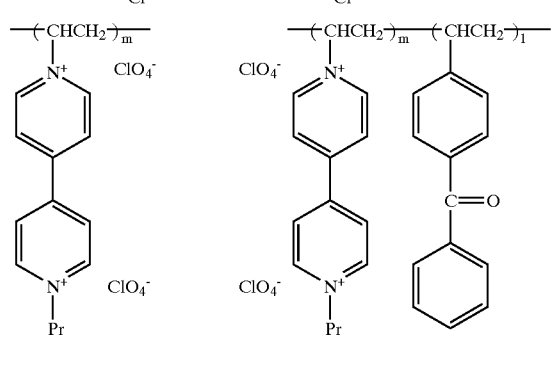

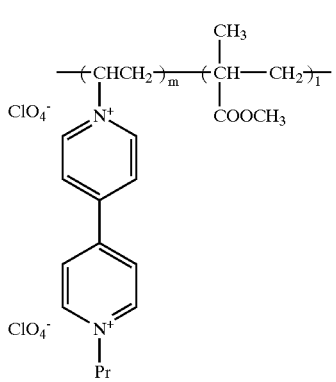

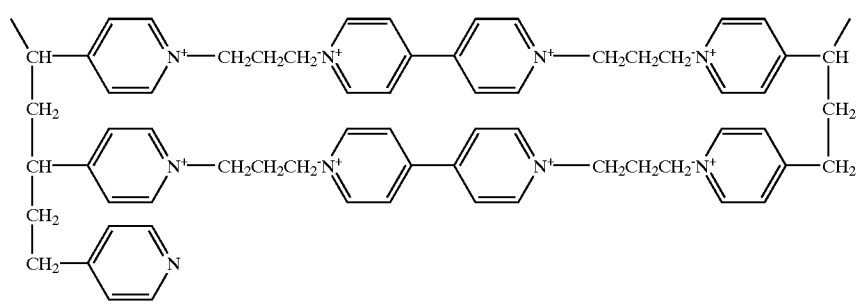

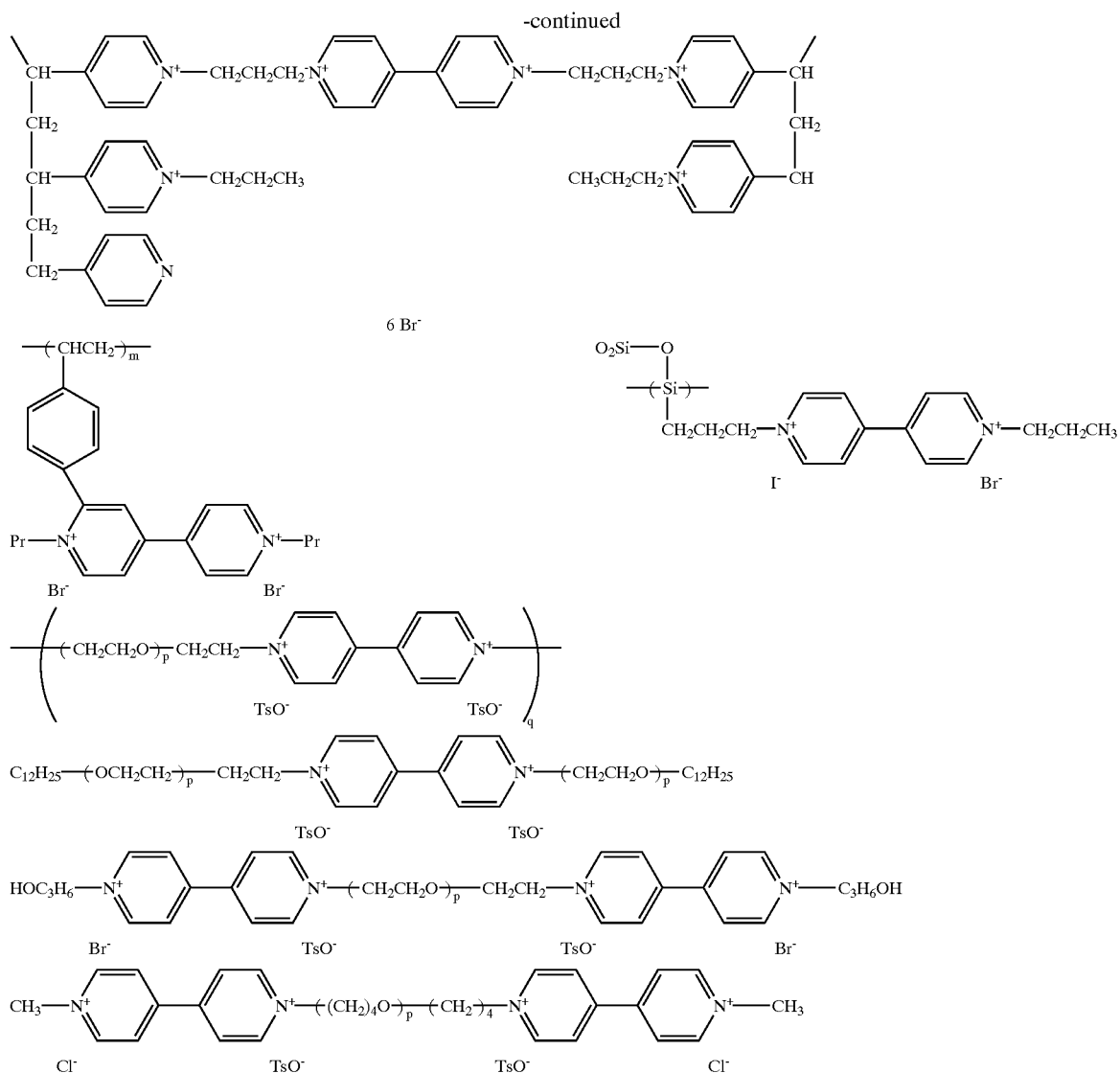

Next, Compound B is described.

As described above, Compound B is encompassed by 4,4'-dipyridyl (Compound B1) and a 1-substituted 4,4'-dipyridinium salt (Compound B2) represented by formula (2).

The substitution structure of 1-substituted 4,4'-dipyridinium salt may be in the form of mixtures.

No particular limitation is imposed on Compound B2 as long as it possesses electrochromic properties when used in combination with Compound A. Compound B2 may thus be high molecular weight or low molecular weight compounds. Such high molecular weight compounds may be those having repeating units containing a 1-substituted- 4,4'-dipyridinium salt or those having at their terminal ends a 1-substituted-4,4'-dipyridinium salt. Such low weight molecular weight compounds may be those having hydrogen or lower molecular weight substituent at the terminal end of a 1-substituted-4,4'-dipyridinium salt.

The high molecular weight compounds having repeating units may be those of which side or main chains are formed of 1-substituted-4,4'-dipyridinium salts. There is no restriction to the repeating units forming the main chains of high molecular weight compounds if 1-substituted-4,4'-dipyridinium salts forms the side chains. Such repeating units may be hydrocarbon units, oxygen-containing units, nitrogen-containing units, polysiloxane units and copolymerized units thereof.

Compound B2 may be a polymer or copolymer represented by the formula

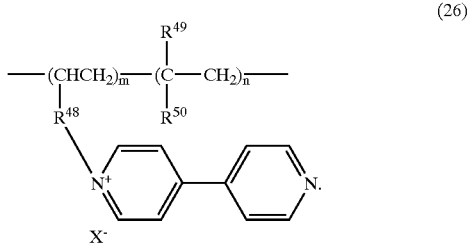

(26)

The letter "m" indicates an integer of more than 1, preferably from 1 to 1,000, and the letter "n" indicates an integer of more than 0, preferably from 0 to 1,000. $R^{48}$ is a $C_1$–$C_{20}$, preferably $C_1$–$C_{12}$ divalent hydrocarbon, residue or merely indicates the bond of the viologen group directly to a polymer chain not through the hydrocarbon residue, namely covalently bond. Specific examples of hydrocarbon groups include aliphatic hydrocarbon groups such as methylene, ethylene, propylene, tetramethylene, pentamethylene and hexamethylene and aromatic hydrocarbon groups such as phenylene, biphenylene and benzylidene. Specific examples of oxygen-containing hydrocarbon groups include aliphatic alkoxylene groups such as —$OCH_2$—, —$OCH_2CH_2$— and —$OCH_2CH_2CH_2$—, aliphatic dialkoxylene groups such as —$OCH_2CH_2O$— and —$OCH_2CH_2CH_2O$—, aromatic aryloxy groups such as —$O(C_6H_4)$— and —$OCH_2(C_6H_4)$— and aromatic diaryloxy groups such as —$O(C_6H_4)O$— and —$OCH_2(C_6H_4)O$—.

$X^-$ indicates a counter anion which is a monovalent anion, with respect to viologen and may be same or different. $X^-$ may be a halogen anion such as $F^-$, $Cl^-$, $Br^-$ and $I^-$, $ClO_4^-$, $BF_4^-$, $PF_6^-$, $CH_3COO^-$ and $CH_3(C_6H_4)SO_3^-$.

$R^{49}$ and $R^{50}$ are each a $C_1$–$C_{20}$, preferably $C_1$–$C_{12}$ hydrocarbon group and a hetero atom-containing substituent and a halogen atom. Preferred hydrocarbon groups for $R^{49}$ and $R^{50}$ are alkyl groups such as methyl, ethyl, propyl and hexyl and an aryl group such as phenyl, tolyl, benzyl and naphtyl. Preferred hetero atom-containing substituents are a $C_1$–$C_{20}$, preferably $C_1$–$C_{12}$ oxygen-containing hydrocarbon group, amide, amino and cyano groups. Such oxygen-containing hydrocarbon groups include an alkoxyl group such as methoxy and ethoxy an aryloxy group such as phenoxy and triloxy, a carboxyl group and a residual carboxylic acid ester.

In the case where the compound of formula (26) is a copolymer, the copolymerization pattern of the repeating units may be that of block-, random- or alternate copolymerization.

Alternatively, Compound B2 may be a polymer or copolymer represented by the formula

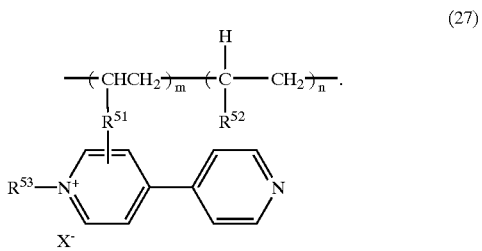

(27)

In formula (27), m, n and $X^-$ are the same as defined in formula (26) and n is preferably 0). $R^{51}$ is the same as defined with respect to $R^{48}$ in formula (48). $R^{52}$ and $R^{53}$ may be the same or different and are each the same as those as defined with respect to $R^{49}$ in formula (26).

In formula (27) $R^{51}$ is allowed to be bonded to any position of the pyridine ring to which $R^{53}$ bonds but may be bonded to the pyridine ring free of substituents.

In the case where a compound of formula (27) is a copolymer, the copolymerization pattern of the repeating units may be that of block-, random- or alternate copolymerization.

Furthermore, Compound B2 may be a polymer or copolymer represented by the formula

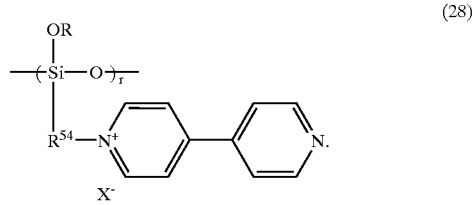

(28)

In formula (28), R is a C1–C10 alkyl group, r is an integer of greater than 1, preferably from 1 to 1,000. $R^{54}$ is the same as those defined with respect to $R^{48}$ in formula (26).

Typical examples of eligible compounds having the above-described 1-substituted dipyridine structure for the present invention have been described in reference with formula (26) through (28). Specific examples of compounds encompassed by these formulae and compounds not encompassed thereby but eligible for the invention are as follows:

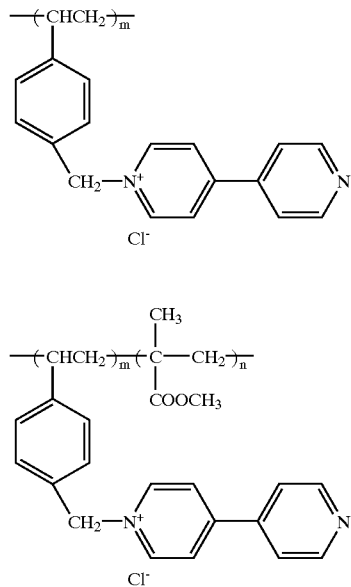

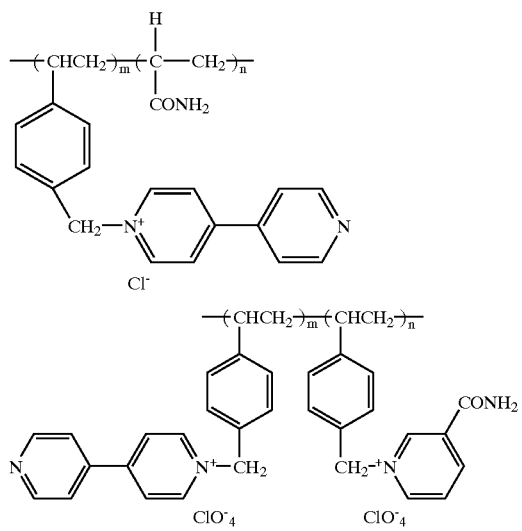

-continued
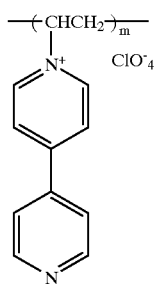 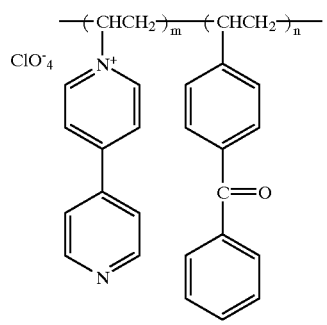 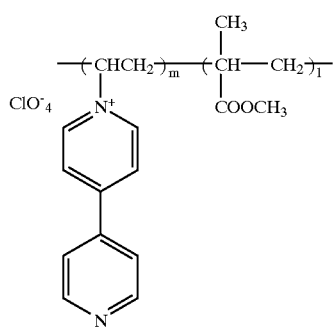
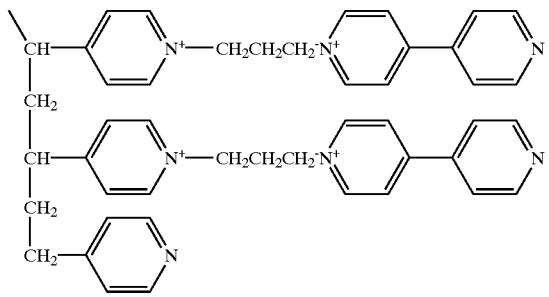
4 Br⁻
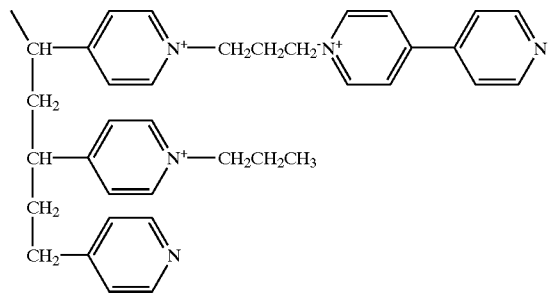
3 Br⁻
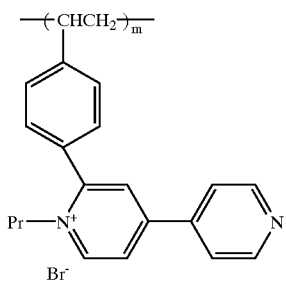 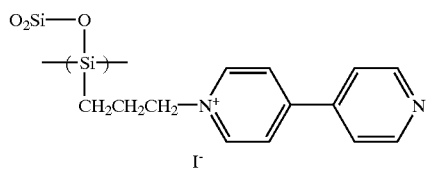
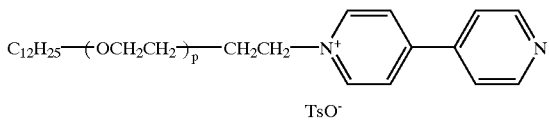 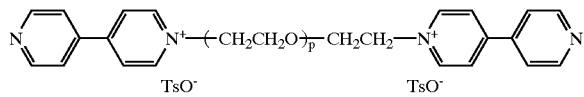
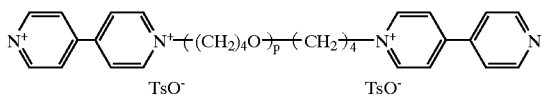 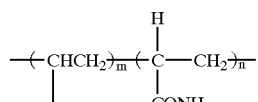
 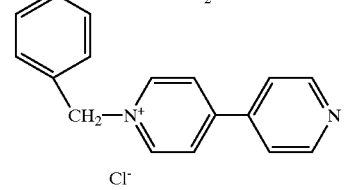
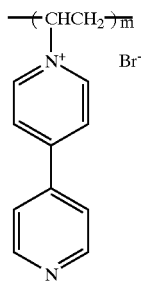

Compounds A, B1 and B2 can be produced by any suitable known method.

As described above, the electrochromic layer of the present invention contains Compound A and Compound B and is typically formed from a composition comprising Compound A and Compound B. Such a composition may be produced by a method in which Compounds A and B are produced separately from each other and then mixed together. Alternatively, the composition may be produced by reacting precursors or materials inducing Compounds A and B, respectively under desired conditions. From an industrial point of view, the latter method is preferred. For example, Compound B1 is a commercial product and thus easily available. Therefore, Compound B1 used as a starting material is reacted with a polymerizing or non-polymerizing halogenated compound of more than equimolecular amounts, usually 1–3 times greater mole of Compound B1 (4,4'-dipyridyl) in an inactive solvent i.e. an organic solvent which is not reactive with 4,4'-dipyridyl and free of halogen, such as alcohols, pentane, hexane, cyclohexane, diethylether, acctone, benzene, toluene, ethyl acetate, acetonitrile, dimethyl formamide and dimethyl sulfoxide, and then heated with stirring for a certain period of time, followed by vacuum-distillation of the solvent and the unreacted halogenated compound so as to obtain a mixture of Compound A, Compound B2 and Compound B1 remaining unreacted.

Although recrystallization or column separation is generally employed for the purification of viologen, such an operation may be omitted and it is sufficient only to remove the halogenated compound used as a starting material and solvent used for reaction.

The molar composition ratio of Compound A to Compound B is within the range of 1:99–99.9:0.1, preferably 80:20–99.9:0.1, and more preferably 95:5–99:1.

The electrochromic layer of the present invention contains essentially Compound A and Compound B but is almost entirely composed of only Compound A and Compound B. The electrochromic layer is obtained by forming these compounds into a film or layer, over the above-mentioned conductive substrate. No particular limitation is imposed on a method of forming the film or layer. A method is employed in which to apply and dry a solution obtained by dissolving Compounds A and B in a solvent. Alternatively, a method is employed in which Compounds A and B are cast over the above-mentioned conductive substrate and then cooled after being melted by heating. The former method is particularly preferred.

No particular limitation is imposed on a solvent used in the former method as long as it is volatile. Examples of such solvents are dimethyl sulfoxide, dimethyl acetamide, dimethyl formamide, N-methyl pyrrolidone, γ-valerolactone, dimethoxyethane, acetnitrile, propionenitrile, tetrahydrofuran, dioxane, methanol, ethanol, propanol, chloroform, toluene, benzene, nitrobenzene and dioxolan.

The applying method may be cast coating, spin coating, dip coating, spray coating, blade coating and flow coating. Drying may also be conducted by any conventional method.

The electrochromic color developing layer is easily oxidized or reduced by being applied with a voltage and thus colored or discolored.

The electrochromic color developing layer is generally 0.01 to 50 μm, preferably 0.1–20 μm.

If necessary, another compounds promoting color developing may be used in combination with Compounds A and B.

BEST MODE FOR CARRYING OUT THE INVENTION

As described above, an electrochromic mirror according to the present invention comprises a reflective conductive substrate, a transparent conductive substrate, an ion conductive layer inserted therebetween and an. electrochromic color developing layer disposed between the ion conductive layer and at least either one of the two conductive substrates, wherein the electrochromic color developing layer contains Compounds A and B. The description is now made to the basic structure of the electrochromic mirror.

FIGS. 1 through 4 exemplarily show the structures of the inventive electrochromic mirror.

Figure 1:
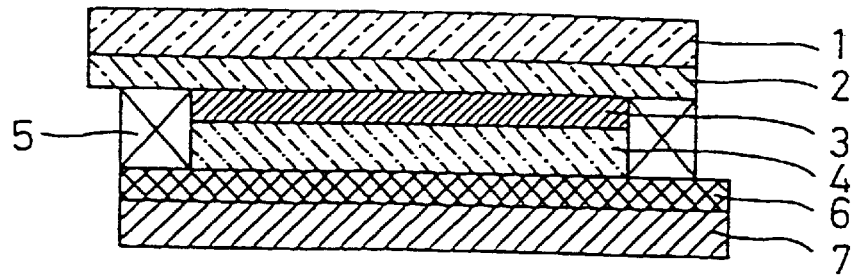
FIG. 1 is a cross-sectional view showing one structure of an electrochromic mirror according to the invention.

The electrochromic mirror shown in FIG. 1 is constituted by a first laminate formed by a transparent conductive substrate including a transparent substrate (1), a transparent electrode layer (2) formed on one surface of the substrate and an clectrochromic color developing layer (3) formed on the electrode layer (2); a second laminate formed by a reflective conductive substrate including a transparent or opaque substrate (7) and a reflective electrode layer (6) formed thereon; and an ion conductive layer disposed in sandwich relation in the space properly provided between the first and second laminates which are placed so that the clectrochromic color developing layer (3) and the reflective substrate (6) face each other.

Figure 2:
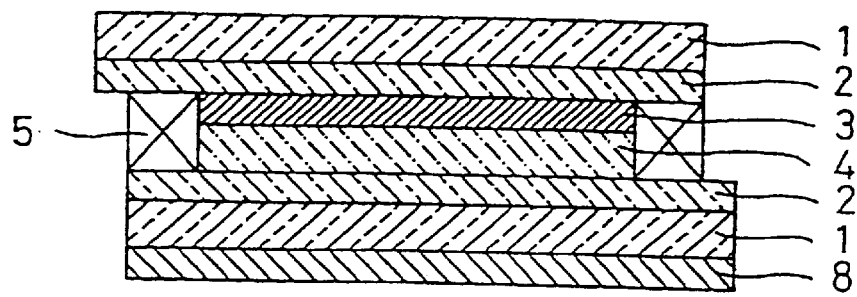
FIG. 2 is a cross-sectional view showing another structure of an electrochromic mirror according to the invention.

The another example of the electrochromic mirror shown in FIG. 2 is constituted by a first laminate formed by a transparent conductive substrate including a transparent substrate (1) and a transparent electrode layer (2) formed on one surface of the substrate and an electrochromic color developing layer (3) formed on the electrode layer (2); a second laminate formed by a transparent substrate (1) having a transparent electrode layer (2) formed on one surface of the substrate and a reflective layer (8) formed on the other surface; and an ion conductive material (4) disposed in sandwich relation in the space properly provided between the first and second laminates which are placed so that the electrochromic color developing layer (3) and the transparent electrode layer of the second laminate (2) face each other.

Figure 3:
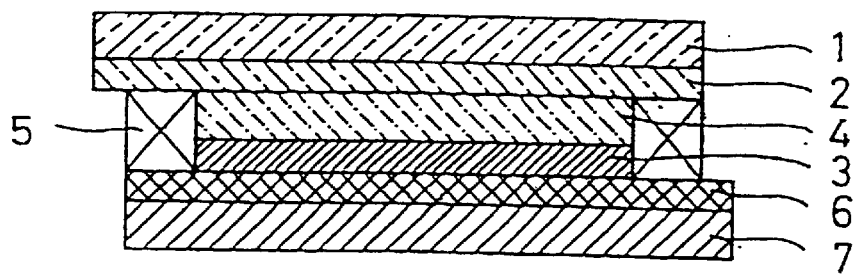
FIG. 3 is a cross-sectional view showing still another structure of an electrochromic mirror according to the invention.

The electrochromic mirror shown in FIG. 3 is constituted by a first laminate formed by a transparent conductive substrate including a transparent substrate (1) and a transparent electrode layer (2) formed on one surface of the substrate; a second laminate formed by a transparent or opaque substrate (7) having a reflective electrode layer (6) formed thereon and an clectrochromic color developing layer (3) formed on the reflective electrode layer (6); and an ion conductive material (4) disposed in sandwich relation in the space properly provided between the first and second laminates which are placed so that the transparent electrode layer and the electrochromic color developing layer (3) face each other.

Figure 4:
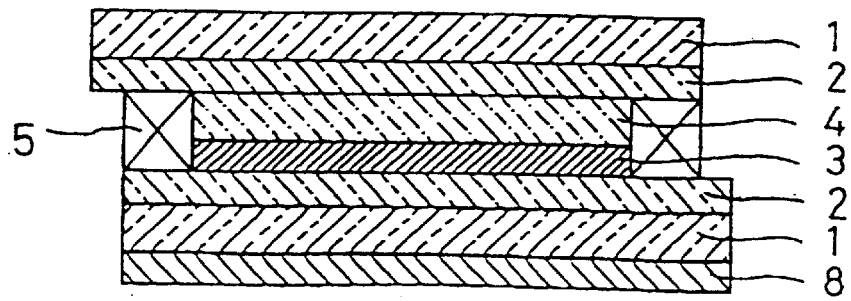
FIG. 4 is a cross-sectional view showing still another structure of an electrochromic mirror according to the invention.

FIG. 4 shows another example of the inventive electrochromic mirror which is constituted by a first laminate formed by a transparent conductive substrate including a transparent substrate (1) and a transparent electrode layer (2) formed thereon; a second laminate formed by a reflective conductive substrate including a transparent substrate (1), a transparent electrode layer (2) formed on one surface thereof and an electrochromic color developing layer (3) formed thereon and a reflective layer (8) formed on the other surface of the substrate (1); and an ion conductive material (14) disposed in sandwich relation in the space properly provided between the first and second laminates which are placed so that the transparent electrode layer (2) of the first laminate and the electrochromic chromogenic layer (3) of the second laminate face each other.

Needless to mention, each of the electrochromic mirrors shown in FIGS. 1 thorough 4 can be colored or bleached by electrochromic phenomenon brought by an electric voltage applied over each electrode. An electric voltage can be applied by any conventional method.

No particular limitation is imposed on a method for forming each of the layers or films of the inventive electrochromic mirror. Each of the layers or films can be formed in accordance with the methods described above. Taking an example from the electrochromic mirror shown in FIG. 1, the transparent electrode layer (2) is formed on the transparent substrate (1) in the above-described manner and then the electrochromic color developing layer (3) is formed on the electrode layer (2) thus formed thereby obtaining a laminate (referred to as Laminate A). Separately, a laminate (referred to as Laminate B) is obtained by forming a reflective electrode layer (6) on a substrate (7) in accordance with the procedure described above. Laminates A and B are placed, facing each other and spaced 1–1,000 μm apart and scaled at their edges with a sealant (5), leaving a portion used for an inlet, thereby forming a empty cell. An ion conductive material or the precursor thereof is injected from the inlet into the cell in a manner described above so as to form the layer of the ion conductive material thereby producing an electrochromic mirror.

When Laminates A and B are placed, facing each other, a spacer may be inserted therebetween so as to provide the space retained constantly. No particular limitation is imposed on such a spacer. There may be used a spacer in the form of beads or a sheet. The spacer may be inserted between the conductive substrates facing each other or provided by forming the protrusions of an insulate material of the electrode on an electric conductive substrate.

The ion conductive material layer (4) may be formed by curing the precursor thereof after being injected into the space between the conductive substrates facing each other and the same. No particular limitation is imposed on a method for curing the precursor. Therefore, the precursor may be cured by using light or heating or by mixing a reactive liquid which cures with the progress of time with the precursor before injection thereof. The inlet of the cell may be sealed in a suitable manner after completion of the injection of the precursor of the ion conductive material.

Alternatively, a transparent electrode layer (2), an electrochromic color developing layer (3) and an ion conductive layer (4) are formed one after another in the order mentioned in the above-described manner thereby forming a laminate (referred to as Laminate A'). Separately from this, a laminate (referred to as Laminate B') is obtained by forming a reflective electrically conductive layer (6) on a substrate (7). Laminates A' and B' are placed, facing each other with a space of 1–1000 μm so that the ion conductive material layer of Laminate A' contacts the reflective electrically conductive of Laminate B' and then sealed at their edges with a sealant (5).

The electrochromic mirror shown in FIG. 2 may be obtained by forming a transparent electrode layer (2) on one surface of a transparent substrate (1) and a reflective layer on the other surface and then followings the same procedure as described with respect to the electrochromic mirror shown in FIG. 1.

The electrochromic mirrors shown in FIGS. 3 and 4 can be produced by taking the same procedure as described with respect to those shown in FIGS. 1 and 2.

Although FIGS. 1 through 4 illustrate the typical examples of the structure of the inventive electrochromic mirror, it is not limited to these structures and thus may contain additional components. Such additional components may be an ultraviolet blocking layer such as an ultraviolet reflective layer and an ultraviolet absorbing layer and an overcoat layer provided to protect the mirror entirely or the surface of each of the films or layers. The ultraviolet blocking layer is preferably disposed on the outer side of a transparent substrate (1) or on a transparent electrode layer formed on the transparent substrate. The overcoat layer is preferably disposed on the outer side of a transparent substrate (1) or the outer side of a reflective layer (8).

The electrochromic device has been described above in reference to an electrochromic mirror. Needless to mention, light controlling clement and display element can be obtained by replacing a reflective conductive substrate with a transparent or non-reflective conductive substrate.

Because the electrochromic device according to the present invention has an electrochromic layer containing specific compounds, it can be easily manufactured at low cost and has an excellent feature that coloration density can be adjusted easily by changing the specifications of the compounds. It is also possible to produce a large-sized mirror enhanced in safety because of availability of a solid electrolyte as an ion conductive material layer which is free from scattering Furthermore, the present invention is contributive to the industry because a viologen compound can be used even if the viologen is not sufficiently purified. Moreover, the present invention can provide an electrochromic device of which viologen compound and electrolyte are hard to be deteriorated even if an acid present in a slight amount in a device (mirror) is mixed with the viologen compound or the electrolyte. As a result of this, the electrochromic device is prevented from being shortened in the lifetime of the coloration and bleach functions and thus can perform its characteristics in a stable manner over an extended period of time.

For the reasons described above, the electrochromic device according to the present invention can be applied particularly suitably to antidazzle mirrors for vehicles such as automobiles and decorative mirrors. Alternatively, the inventive electrochromic device is applicable to various types of display and light controlling device as well.

The present invention will now be described in further detail with reference to Examples, which are given only by way of illustration and are not intended for limiting the invention.

EXAMPLE 1

(1) Synthesis of Electrochromic Compound

After 4,4'-dipyridyl and 1-bromopropane in an equimolar ratio were reacted by heating in acetone with refluxing, an acetone solvent and unreacted 1-brompropane was distilled out thereby obtaining a solid substance containing 4-(4'-dipyridyl) pyridinium. The solid substance was reacted with 1,2-dibromoethane at 100° C. in dimethyl formamide thereby obtaining a viologen mixture containing 1-propyl-1'-bromoethyl-4,4'-dipyridinium bromide. HBr was removed from the mixture with a NaOH solution thereby obtaining a viologen mixture monomer containing 1-propyl-1'-vinyl-4,4'-dipyridinium bromide.

The resulting monomer was subjected to bulk polymerization using di-t-butylperoxide as a catalyst at 130° C. thereby obtaining a solid substance (referred to as Solid A) containing a polymer with a structure below as the main component (average molecular weight: about 4,000, m: about 10).

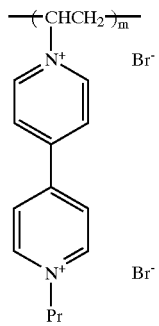

The polymer thus obtained was subjected to Soxlet extraction using methanol. The eluted product obtained by removing the methanol was evaluated with liquid chromatography and ¹H-NMR and found to be 4,4'-dipyridyl the amount of which was about 0.1% of the 4,4'-dipyridyl which was subjected to the initial reaction.

The remaining polymer was then subjected to neutralization titration reaction using an HBr aqueous solution in water and HBr in an amount of 3% by molar ratio of the initial 4,4'-dipyridyl was consumed. Namely, it was confirmed that about 3%, by mole of 1-substituted dipyridinium salt was present in the polymer.

(2) Preparation of Electrochromic Mirror

Solid A produced in (1) above was dissolved in nitrobenzene to make it a solution containing 10% by weight of Solid A. The solution was applied onto the surface on which a platinum film (reflective electrode) was formed, of a substrate and then heated on a hot plate to remove nitrobenzene so as to form the thin film of the electrochromic compound with a thickness of 5 μm thereby obtaining a reflective conductive substrate with an electrochromic layer (designated hereinafter as Laminate A).

A glass substrate with an electrically conductive layer of palladium was used as a transparent conductive substrate (designated hereinafter as Laminate B). An epoxy-based resin was applied in the form of lines on the edges other than a portion forming an inlet of an electrolyte precursor solution, of Laminate B. Laminate A was superposed on Laminate B such that the electrochromic layer faced the transparent electrode layer while being pressed so as to cure the adhesive thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number: 4) manufactured by SHIN NAKAMURA CHEMICAL CO., LTD. under the trade name of ME04, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane-1-on manufactured by Merk Co,. Ltd., under the name of "Darocure-1116" as a photo-polymerization initiator in a dark room thereby obtaining an electrolyte precursor. The electrolyte precursor was then injected into the cell obtained above through the inlet after being deaerated.

After the injection port was sealed with an epoxy sealant, the electrolyte precursor in the cell was cured by exposing the side of the transparent substrate of the cell to fluorescent light so as to form a solid electrolyte thereby obtaining an all solid type electrochromic mirror of the structure as shown in FIG. 3.

The mirror when assembled was not colored and had a reflectance of about 85%. The mirror was quick in response to an electric voltage and exhibited excellent electrochromic properties. Namely, the mirror was colored upon application of a voltage of 1.5 V and had a reflectance of about 15%. The mirror was still in the coloring state even after stopping the application of voltage and had a reflectance of about 10% after 100 hours later. The mirror was evaluated by repeating coloration and decoloration operation and exhibited a constant level of coloration about more than 150,000 times.

EXAMPLE 2

(1) Synthesis of Electrochromic Compound

After 4,4'-dipyridyl, 1-chloropropane and p-chloromethyl styrene in an equimolar ratio were reacted by heating in acetone with refluxing, the acetone solvent was distilled out thereby obtaining a solid substance containing N-propyl-N'-(p-vinylphenylmethyl)dipyridinium dichloride as the main component. No further purification was done for the solid substance.

5 g of the solid substance obtained above, 0.92 g of acrylicamide and 30 ml of pure water were added to a 100 ml three-neck flask and then stirred with a magnetic stirrer, followed by addition of 0.1 ml of 30% hydrogen peroxide aqueous solution. The mixture was heated at a temperature of 50° C. After 12 hours, the reaction solution was poured into acetone to precipitate a polymer thereby obtaining a solid substance (referred to as Solid B) having a polymer of the following structure (average molecular weight was about 3,500 and both m and n were about 7.5) shown below, as the main component.

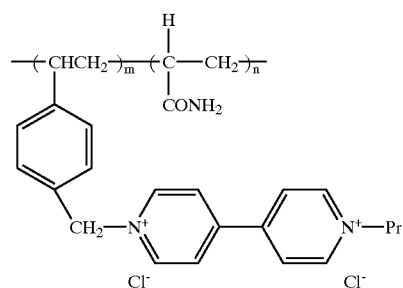

Solid B thus obtained was subjected to Soxlet extraction using methanol. The eluted product obtained by removing the methanol was evaluated with liquid chromatography and ¹H-NMR and found to be 4,4'-dipyridyl in an amount of about 0.1% of the 4,4'-dipyridyl which was added for the initial reaction.

The remaining polymer was then subjected to neutralization titration reaction using an HBr aqueous solution in water and HBr in an amount of 3%. by molar ratio of the initial 4,4'-dipyridyl was consumed. Namely, it was confirmed that about 2% by mole of 1-substituted dipyridinium salt is present in the polymer.

(2) Preparation of Electroehromic Mirror

Solid B produced in (1) above was dissolved in nitrobenzene to make it a solution containing 10% by weight of Solid A. The solution was applied onto the surface, on which a platinum film (reflective electrode) was formed, of a substrate and then heated on a hot plate to remove nitrobenzene so as to form the thin film of the electrochromic compound with a thickness of 5 μm thereby obtaining a reflective conductive substrate with an electrochromic layer (referred to as Laminate C).

Laminate B was used as a transparent conductive substrate. An epoxy-based resin was applied in the form of lines on the edges other than a portion forming an inlet of an electrolyte precursor solution, of Laminate B. Laminate C was superposed on Laminate B such that the electrochromic layer faced the transparent electrode layer while being pressed so as to cure the adhesive thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number 4) manufactured by SHIN NAKAMURA CHEMICAL CO., LTD. under the trade name of ME04, 0.02 g of polyethylene glycol dimethacrylate (oxyethylene unit number 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane-1-on manufactured by Merk Co,. Ltd., under the name of "Darocure-1116" as a photopolymerization initiator in a dark room thereby obtaining an electrolyte precursor. The electrolyte precursor was then injected into the cell obtained above through the inlet after being deaerated.

After the injection port was sealed with an epoxy sealant, the electrolyte precursor in the cell was cured by exposing the side of the transparent substrate of the cell to fluorescent light so as to form a solid electrolyte thereby obtaining an all solid type electrochromic mirror of the structure as shown in FIG. 3.

The mirror when assembled was not colored and had a reflectance of about 85%. The mirror was quick in response to an electric voltage and exhibited excellent electrochromic properties. Namely, the mirror was colored upon application of a voltage of 1.5 V and had a reflectance of about 15%. The mirror was still in the coloring state even after stopping the application of voltage and had a reflectance of about 10% after 100 hours later. The mirror was evaluated by repeating coloration and decoloration operation and exhibited a constant level of coloration about more than 150,000 times.

What is claimed is:

1. An electrochromic device comprising two conductive substrates, at least one of which is transparent, an ion conductive layer disposed therebetween and an electrochromic color developing layer disposed between the ion conductive layer and at least either one of the two conductive substrates and containing (A) a compound having a viologen structure represented by the formula

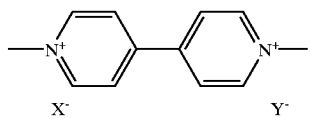

(1)

wherein $X^-$ and $Y^-$ are the same or different and are each a counter anion selected from the group consisting of a halogen anion, $ClO_4^-$, $BF_4^-$, $PF_6^-$, $CH_3COO^-$ and $CH_3(C_6H_4)SO_3^-$ and (B) 4,4'-dipyridyl and/or a 1-substituted 4,4'-dipyridinium salt represented by the formula

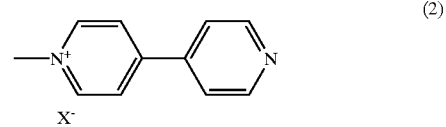

(2)

wherein $X^-$ is a counter anion selected from the group consisting of a halogen anion, $ClO_4^-$, $BF_4^-$, $PF_6^-$, $CH_3COO^-$ and $CH_3(C_6H_4)SO_3^-$; and wherein the compound having a viologen structure represented by formula (1) is selected from the group consisting of a high molecular weight compound having a viologen structure unit or a unit containing a viologen structure as a repeating unit, a high molecular weight compound having a high molecular weight substitute at the end of a viologen structure, and a high molecular weight compound substituted in part with a group having a viologen structure.

2. The electrochromic device according to claim 1 wherein each of the ion conductive layer and the electrochromic color developing layer is a solid.

3. The electrochromic device according to claim 1 wherein it is an electrochromic mirror.

4. The electrochromic device according to claim 1, wherein said electrochromic color developing layer has a thickness in a range of 0.01 to 50 μm.

5. The electrochromic device according to claim 1, wherein the molar composition ratio of Compound (A) to Compound (B) is in a range of 80:20 to 99.9:0.1.

6. The electrochromic device according to claim 1, wherein said high molecular weight compound having a viologen structure unit or a unit containing a viologen structure as a repeating unit has a viologen structure in a side chain or in a main chain.

7. The electrochromic device according to claim 6, wherein said high molecular weight compound having a viologen structure as the side chain has a unit selected from the group consisting of a hydrocarbon unit, an oxygen-containing hydrocarbon unit, a nitrogen-containing hydrocarbon unit and a polysiloxane unit as a repeating unit of its main chain.

8. The electrochromic device according to claim 1, wherein said 1-substituted 4,4-dipyridinium salt represented by formula (2) is selected from the group consisting of a low molecular weight compound having said salt, a high molecular weight compound having said salt unit or a unit containing said salt unit as a repeating unit, and a high molecular weight compound having a high molecular weight substitute at the end of said salt.

9. The electrochromic device according to claim 8, wherein said high molecular weight compound having said salt unit or a unit containing said salt unit as a repeating unit has said salt unit in a side chain or a main chain.

10. The electrochromic device according to claim 9, wherein said high molecular weight compound having said salt in the side chain has a unit selected from the group consisting of a hydrocarbon unit, an oxygen-containing hydrocarbon unit, a nitrogen-containing hydrocarbon unit and a polysiloxane unit as a repeating unit of its main chain.

* * * * *